United States Patent [19]

Andreatti, Jr.

[11] Patent Number: 4,745,272

[45] Date of Patent: May 17, 1988

[54] APPARATUS FOR IDENTIFYING ARTICLES FROM RECEIVED ILLUMINATION WITH LIGHT ADJUSTMENT MEANS

[75] Inventor: Evo Andreatti, Jr., Rheems, Pa.

[73] Assignee: RCA Licensing Corporation, Princeton, N.J.

[21] Appl. No.: 907,219

[22] Filed: Sep. 15, 1986

[51] Int. Cl.[4] .......................... G01J 1/32; G01N 9/04; G06M 7/00

[52] U.S. Cl. ................................ 250/205; 250/223 R

[58] Field of Search ............... 250/205, 223 R, 223 B, 250/222.2, 222.1; 209/588, 576, 577; 356/443, 239

[56] References Cited

U.S. PATENT DOCUMENTS

| | | | |
|---|---|---|---|
| 3,980,180 | 9/1976 | Jamieson | 250/223 R |
| 4,118,654 | 10/1978 | Ohta et al. | 250/205 |
| 4,266,675 | 5/1981 | Barwise et al. | 209/588 |
| 4,315,245 | 2/1982 | Nakahara et al. | 250/205 |
| 4,406,530 | 9/1983 | Hasegawa et al. | 250/205 |
| 4,525,735 | 6/1985 | Krufka | 358/10 |
| 4,625,871 | 12/1986 | Satake | 209/549 |
| 4,693,378 | 9/1987 | Azegami et al. | 358/107 |

FOREIGN PATENT DOCUMENTS

| | | | |
|---|---|---|---|
| 2091415 | 7/1982 | United Kingdom | 209/576 |

*Primary Examiner*—David C. Nelms
*Assistant Examiner*—Michael Messinger
*Attorney, Agent, or Firm*—E. M. Whitacre; D. H. Irlbeck; L. L. Hallacher

[57] ABSTRACT

A system for identifying articles in accordance with light transmission through the article includes a light sensor which provides a signal indicative of the light transmission. A circuit responds to the signal and provides an output in accordance with the transmission levels. The output is provided to a control to identify the article and to adjust the illumination level to the article.

4 Claims, 2 Drawing Sheets

APPARATUS FOR IDENTIFYING ARTICLES FROM RECEIVED ILLUMINATION WITH LIGHT ADJUSTMENT MEANS

BACKGROUND

This invention relates generally to light responsive control systems and particularly to a system for identifying kinescope panel types in accordance with the light transmission capability of such panels.

During the production of picture tubes for color television receivers a coating of black matrix material is applied to the inside surface of the panels upon which the viewing screen is produced. The black matrix coating includes a large number of transparent areas which have a particular configuration and which are arranged in a particular pattern, depending upon the type of picture tube being produced. Thus, the transparent areas can be dots, when a dot type of tube is to be produced, or long vertical transparent lines, when a line screen type of tube is to be produced. In either event, the transparent areas are coated with slurries of photosensitive materials including phosphors which emit the three primary colors of light when impacted by electrons. Typically, prior to the application of the phosphors, the widths and other dimensions of the transparent areas are measured to verify that the dimensions of the areas are within acceptable tolerances to avoid the expensive application of phosphors to improperly matrixed panels. A method for measuring the transparent dots in a dot type of panel is described in Application Ser. No. 856,008 filed Apr. 25, 1986, entitled "Method Measuring Transparent Elements In An Opaque Medium" by Frank S. Krufka. A system for measuring the lines and line spacings in line type of kinescope panel is described in U.S. Pat. No. 4,525,735. The teachings of these disclosures are incorporated herein by reference.

Although the referenced application and patent are respectively directed to measuring dots and lines in kinescope panels, both measurements typically are made utilizing a programmable computer. This is advantageous because a single programmable computer can be utilized to effect both measurements. Accordingly, both types of panels can be measured in random order by the system. However, the random measurement of various types of panels requires that the panel type be identified to the computer prior to initiating the measurement routine. Some of the panels have dot shaped transparent areas, and other panels have line shaped transparent areas. Accordingly, the transmission of light through the two types of panels is different. Also, various types of dot screens have different size dots, dependent upon the desired resolution of the visual display. The same is true of line screens, in that screens for larger tubes have larger line widths than those for smaller tubes. The light transmission capabilities of various types of panels, therefore, can be measured and stored. The random processing of various types of panels can be made possible by storing the known transmission capabilities of the various types of panels and comparing the measured transmission capability of an unknown panel type to identify the panel. For these reasons there is a need for a system for identifying kinescope panel types in accordance with the light transmission capabilities of such panels. The present invention fulfills this need.

SUMMARY

A system for identifying an article in accordance with the intensity of illumination received from the article includes a light detector, arranged in the proximity of a camera for receiving illumination from the object and for providing an illumination level signal in response to the illumination. A circuit is responsive to the illumination level signal, and provides an output signal having a level indicative of the level of illumination received from the object. The output of the circuit is provided to a control means whereby control means provides an identification signal for identifying the article. A light adjustment means adjusts the illumination source in accordance with the identification signal.

DETAILED DESCRIPTION

Figure 1:
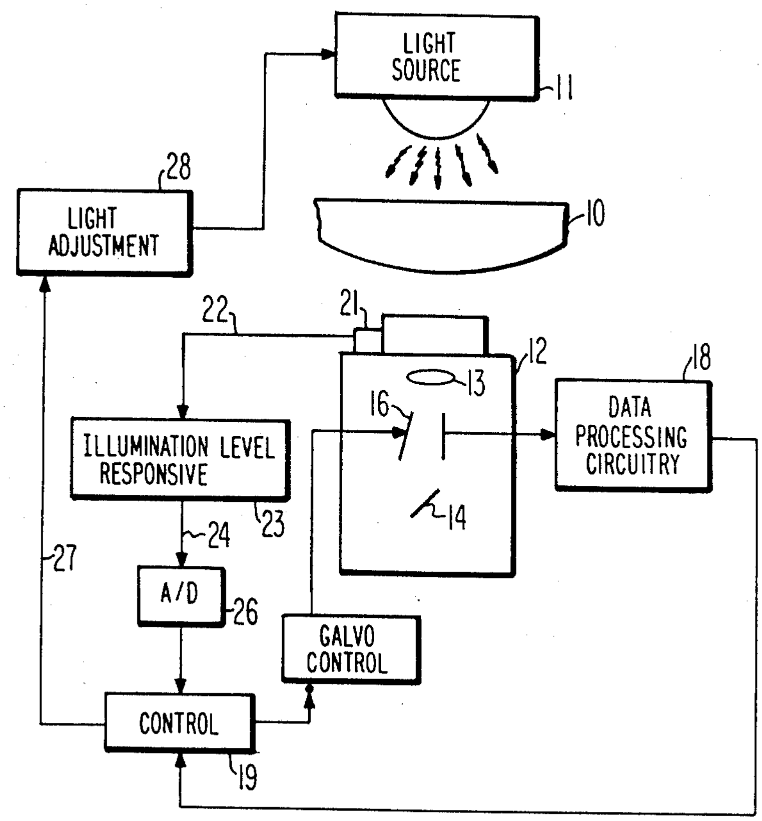
FIG. 1 is a block diagram of a preferred embodiment.

In FIG. 1, an article 10, such as a panel for a kinescope, is arranged between an illumination source 11 and a camera 12. The camera 12 includes a lens 13, a fixed mirror 14, a rotatable galvo mirror 16 and a light responsive detector 17, such as a photodiode array. The camera 12 focuses illumination, which passes through the panel 10 from the illumination source 11, onto the photodiode array 17. The output of the photodiode array 17 is provided to data processing circuitry 18 and control circuitry 19, which includes a programmable computer. The operation of the camera 12, the processing circuitry 18 and the control circuit 19 can be as described in the above-referenced Application Ser. No. 856,008 and U.S. Pat. No. 4,525,735. An illumination detector 21, which preferably is a photodiode, is arranged to receive illumination passing through the panel 10. The illumination detector 21 produces an illumination level signal on an output line 22 and provides the signal to an illumination level responsive circuit 23. The output signal of the illumination level circuit 23, therefore, is an analog signal available on an output line 24, the level of which is indicative of the intensity of illumination passing through the panel 10 to the detector 21. The output signal on line 24 is applied to the control 19 through an analog-to-digital converter (A/D) 26.

The control circuit 19 includes a programmable computer which is programmed in either of several fashions. The transmission levels of various types of panels can be stored in the computer and the illumination intensity level from the A/D 26 compared to the stored levels to specifically identify the type of panel through which the illumination passed. The panel type identification information can be applied by an output line 27 to a light adjustment circuit 28 to adjust the illumination provided by the illumination source 11 to the panel 12. Alternatively, the output signal of the illumination level circuit 23 can be used to indicate a dot screen panel when the illumination is below a preselected level and a line screen panel when the illumination is above a preselected level.

Figure 2:
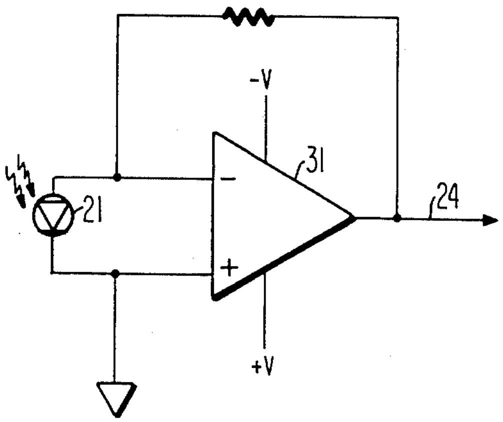
FIG. 2 is a preferred embodiment of the illumination detector and illumination responsive circuit.

FIG. 2 is a preferred embodiment of the light detector 21 and the illumination level responsive circuit 23. The light detector 21 preferably is a photodiode, which is connected across the input terminals of an operational amplifier 31. The photodiode 29 responds to the illumination received from the panel 10 and the voltage to the amplifier 31 varies as the intensity of the illumination varies. The output of the operational amplifier 31, on the output line 24 therefore varies, and varies the input to the A/D 26.

Figure 3:
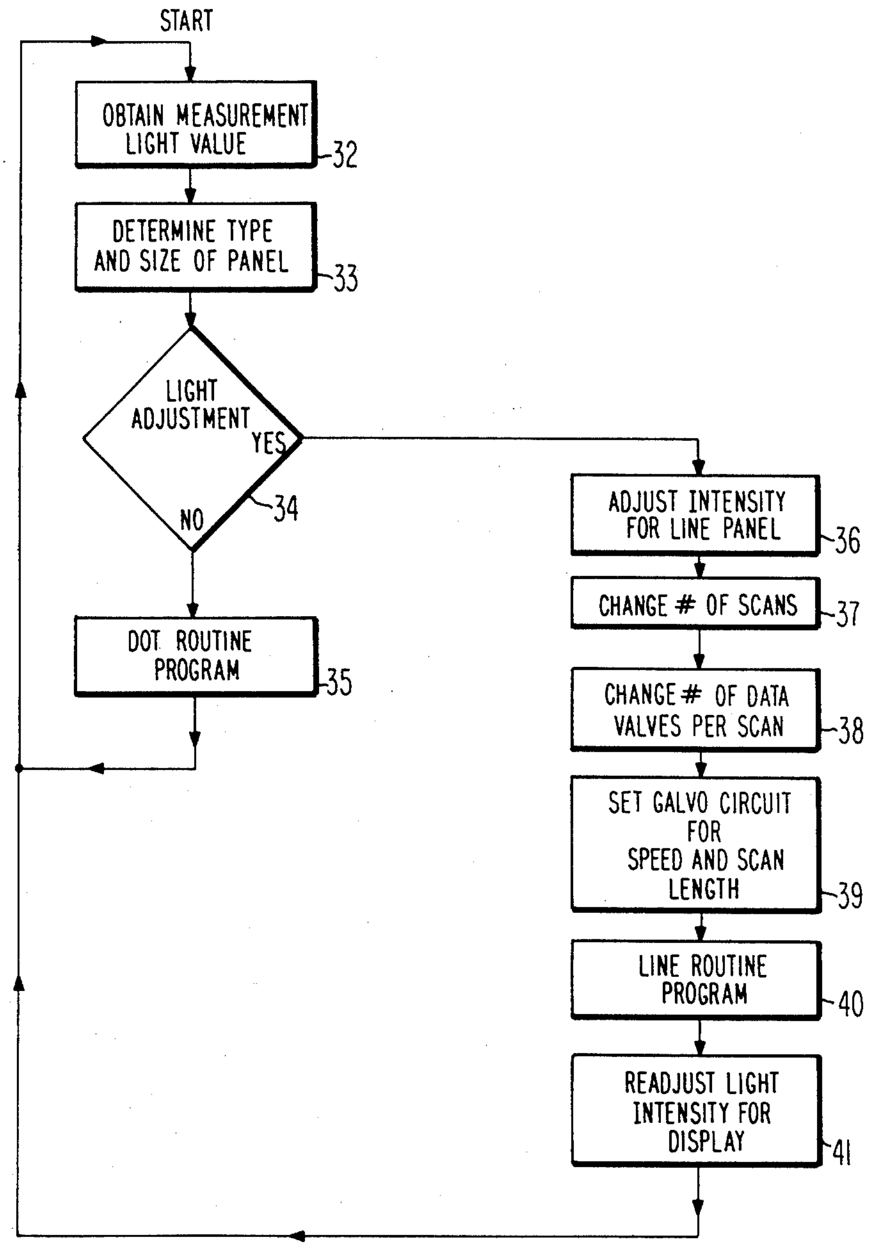
FIG. 3 is a flow chart of a preferred embodiment.

FIG. 3 is a flow chart of a method for identifying a panel 10 using the system of FIG. 1 and circuit of FIG. 2. The method starts at step 32 by measuring the illumination received from the panel. This step constitutes the reception of the illumination energy by the photodetector 21 and the application of the resulting signal to the control circuit 19 of FIG. 1. At step 33 the size and type of panel are determined by comparing the received illumination value and the known transmission values of various panel types which are stored in the control 19. In decision 34 a determination of whether a light adjustment is required. The system is normally set for one panel type, such as a dot panel. When the received illumination is from such a panel, no such adjustment is required and step 35 is entered and the stored program for identifying dot panel types is selected to further identify the panel as a particular dot panel type. The galvo 16 of the camera 12 is then scanned for the number of scans, the data value per scan, and the speed and length of scans needed for the measurement of the transparent dots of a dot panel.

At decision 34, when a light adjustment is required, step 36 is entered because a line panel has been indicated and the light adjustment circuit 28 of FIG. 1 is utilized to adjust the light source 11 in accordance with the desired illumination for a line panel. Step 37 is entered to change the number of scans to be consistent with that needed to measure the transparent lines of a line panel. Step 38 is entered to change the number of data lines per scan. At step 39 the galvo circuitry is set for the speed and scan length needed with a line pattern. At step 40 the line identification routine is selected. As stated above, both the dot pattern identification method described in the copending Application Ser. No. 856,008 fully referenced hereinabove and U.S. Pat. No. 4,525,735 are stored in the memory of control circuit 19. The line identification is now selected. At step 41 the light source 11 (FIG. 1) is adjusted in intensity to that needed for a line panel.

What is claimed is:

1. In a system for identifying an article by the intensity of illumination received from said article, said system including an illumination source for illuminating said article, a camera for receiving illumination from said article and for providing illumination data representative of said illumination, and control means for controlling said system in response to said illumination, an improvement comprising:

light detector means, arranged in the proximity of said camera to receive substantially the same illumination as said camera, said light detector means providing an illumination level signal in response to said illumination;

circuit means responsive to said illumination level signal, said circuit means providing an output signal having a level indicative of the intensity of the illumination from said article;

means for providing the output of said circuit means to said control means whereby said control means provides an identification signal for identifying said article; and light adjustment means responsive to said control means for adjusting said illumination source in accordance with said identification signal.

2. The improvement of claim 1 wherein said article is a kinescope panel having a screen whereby dot and line screen panels are identified.

3. The improvement of claim 2 wherein said light detector means is a photodiode.

4. The improvement of claim 3 wherein said circuit means includes an operational amplifier.

* * * * *